United States Patent [19]

Carter

[11] Patent Number: 4,896,910
[45] Date of Patent: Jan. 30, 1990

[54] COMBINATION BUMPER AND TIRE STORAGE COMPARTMENT

[76] Inventor: Bernie R. Carter, 7123 Thrush View #30, San Antonio, Tex. 78209

[21] Appl. No.: 251,307

[22] Filed: Sep. 30, 1988

[51] Int. Cl.⁴ .............................................. B62D 43/00
[52] U.S. Cl. ..................................... 293/117; 293/106; 296/37.2; 224/42.06
[58] Field of Search ............... 293/106, 102, 126, 136, 293/149, 155; 296/37.2; 280/152.05; 224/42.06

[56] References Cited

U.S. PATENT DOCUMENTS

| | | | |
|---|---|---|---|
| 2,034,834 | 3/1936 | Robinson, Jr. | 296/37.2 X |
| 2,080,989 | 5/1937 | Smith | 296/37.2 X |
| 2,175,769 | 10/1939 | Biszantz | 296/37.2 |
| 2,603,527 | 7/1952 | Perkins | 296/37.2 |
| 3,005,657 | 10/1961 | Walker | 296/37.2 |
| 3,210,117 | 10/1965 | Hall | 296/37.2 |
| 3,618,835 | 11/1971 | Terry et al. | 224/42.06 |
| 3,698,609 | 10/1972 | Lund | 224/42.06 X |
| 3,869,075 | 3/1975 | Kissner | 224/42.06 |
| 4,087,032 | 5/1978 | Miller et al. | 296/37.2 X |

FOREIGN PATENT DOCUMENTS

| | | | |
|---|---|---|---|
| 1041902 | 10/1953 | France | 296/37.2 |
| 1084561 | 1/1955 | France | 296/37.2 |

Primary Examiner—Robert J. Oberleitner
Assistant Examiner—Mark T. Le
Attorney, Agent, or Firm—Kenneth H. Johnson

[57] ABSTRACT

A step bumper having a hinged door as the step, such door being of sufficient width and height to accommodate a spare tire. Two attachment extensions are provided for securing the bumper to the main frame members of the vehicle. Support mechanism are provided in the form of two steel straps attachable by one end to a cross member on the underside of the vehicle and to the bumper attachment extensions at the opposite end. The straps are shaped to conform to the shape of a spare tire. The step is hinged to the extensions and releasably held closed by hand operated knob bolts, which extend through holes in each side of the step into corresponding threaded holes, e.g., nuts welded on to the extensions.

4 Claims, 2 Drawing Sheets

COMBINATION BUMPER AND TIRE STORAGE COMPARTMENT

BACKGROUND OF THE INVENTION

1. Field of the Invention

The present invention relates to tire storage compartment, particularly for pick-up trucks and other vehicles wherein the spare tire storage is below the frame of the vehicle.

1. Related Art

Several types of vehicles provide for storage of the spare tire underneath the vehicle near the rear. Most common among these are light pick-up trucks and station wagons. Access to the spare tire so located can be difficult and time consuming. For instance, removing the spare tire may require that the operator or mechanic physically crawl under the vehicle and manipulate the retention mechanism and wrestle the spare tire from under the vehicle. Replacement of the tire is just as time consuming and arduous. Some people prefer to take the vehicle to a service station or garage which has a lift in order to facilitate the removal and replacement of the spare tire. However, tires do not conveniently go flat in or near such establishments, leaving the operator no choice at least as to the removal of the spare. In such cases, due to the difficulty of replacement of the tire, it is commonly tossed into the freight compartment of the vehicle taking up useful space and exposing the tire (and wheel) to the risk of theft.

Pick-up trucks especially may be ordered with "custom" rear bumpers which are desirable as much for appearance as well as particular functions. Such bumpers may ordered from and attached by the dealer or may be bought and installed by the owner. Particularly popular are "step" bumpers which have a cut out or step in the enter portion of the bumper to allow easy access over the tailgate of a pick-up truck. Often these "step" bumpers include one or more apertures in the step for installation of towing "balls". In such cases, the bumpers must be of sufficient strength and be attached securely in order to support both the "tongue" and "towing" weight of the trailer or other towed apparatus.

Attachment of such a bumper to the vehicle frame is rather simple. Several bolt holes are provided in the two main longitudinal vehicle frame members. The bumper is provided with extensions which align with the frame and bolt holes allowing the bumper to be secured to the frame with suitably sized bolts and nuts.

The inventor hereof thus conceived of a simply installed combination bumper and tire storage compartment which allows easy access to the spare tire and at the same time provides for a decorative and useful bumper.

SUMMARY OF THE INVENTION

Briefly, the present invention provides a step bumper having a hinged door as the step, such door being of sufficient width and height to accommodate a spare tire. Two attachment extensions are provided for securing the bumper to the main frame members of the vehicle. Support means are provided in the form of two steel straps attachable by one end to a cross member on the underside of the vehicle and to the bumper attachment extensions at the opposite end. The straps are shaped to conform to the shape of a spare tire and may be angled slightly downward toward the front of the vehicle to securely support the tire underneath the rear of the vehicle.

DESCRIPTION OF THE PREFERRED EMBODIMENT

Figure 1:
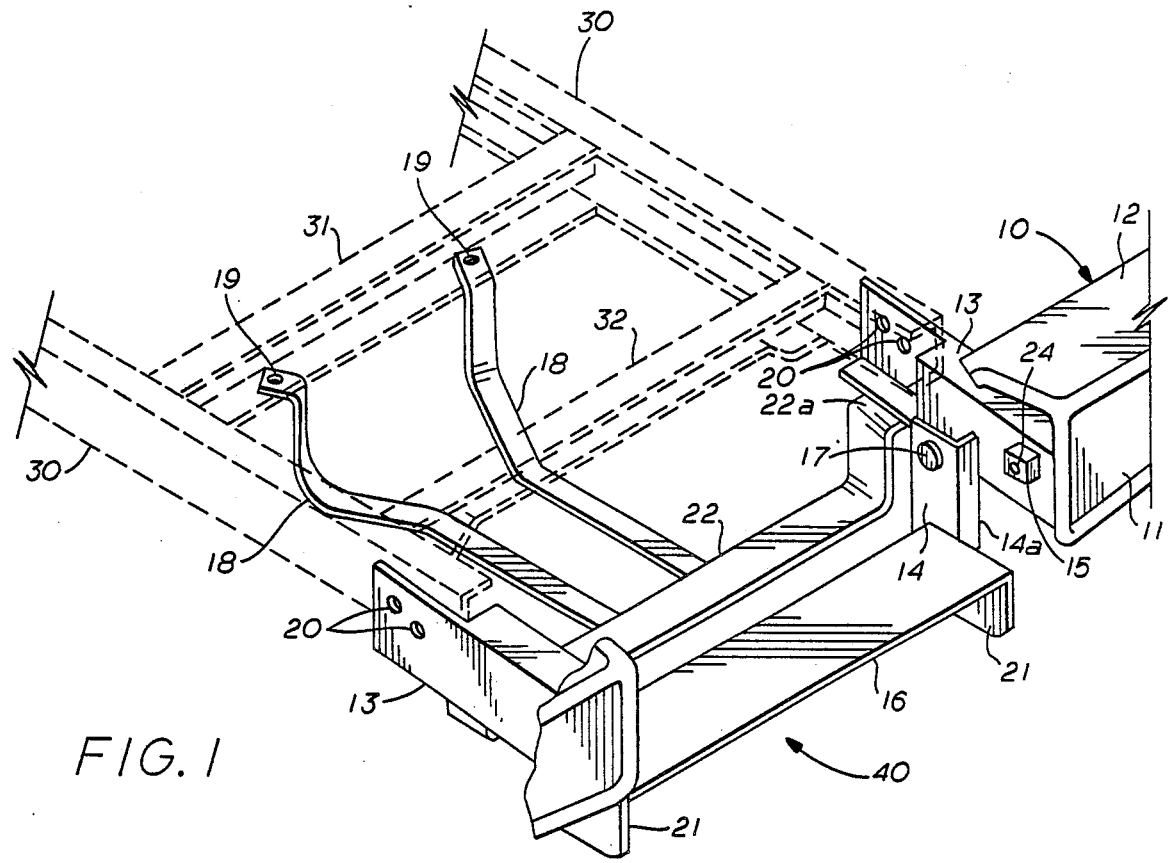
FIG. 1 is a perspective of the bumper with the access door and support straps of the invention.

Referring now to the figures in which like components are given like reference numerals, a description of the preferred embodiment of the invention is shown.

Figure 2:
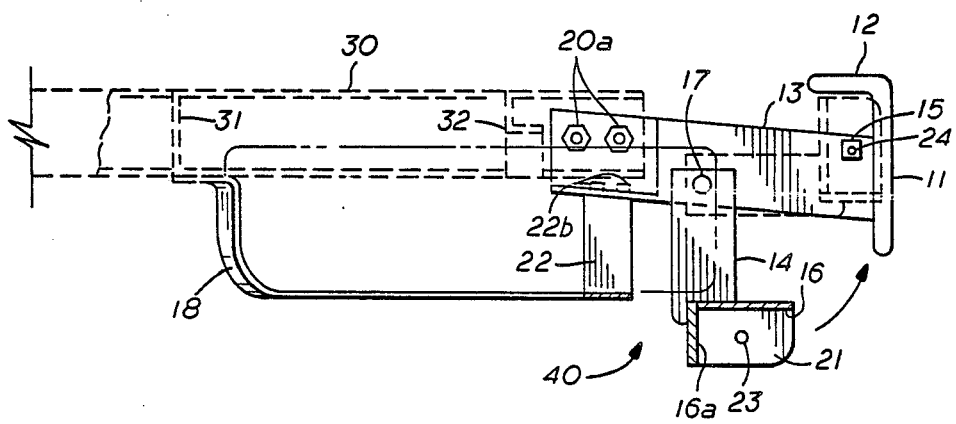
FIG. 2 is side elevational view of the invention.

Referring first to FIGS. 1 and 2, the components of the preferred embodiments are shown. The figures show a partial view of the bumper which is generally shown at 10. The bumper 10 includes a top surface 12 and rear surface 11, the rear surface 11 is shown facing away from the rear of the vehicle to which the bumper is attached. The bumper 10 is attached to the vehicle by extensions 13 which may be welded or otherwise attached to the inside of rear face 11 and thence to the main frame members 30 by bolts which are passed through bolt holes 20 on the extensions 13.

Support means for the spare tire are shown as steel straps 18 which are contoured and shaped to fit a spare tire at the end facing the front of the vehicle. The straps 18 are attachable at the front ends by bolts (not shown) through bolt holes 19 to vehicle frame cross member 31, and are attached, as by welding, to cross bar 22 at the opposite end. The cross bar 22 is in the form of a U with flanges 22a extending outward from the top of the U. The cross bar 22 is attached to extensions 13 by bolts 22b through the flanges 22a. Together, the straps 18 and the cross bar 22 create a storage space into which a spare tire may be placed and supported.

Door means, generally indicated at 40, is provided in the bumper 10 immediately adjacent to the storage space created by the straps 18 and cross bar 22. The door means comprises a rectangular box like structure open at the rear and top and having side members 21, front member (facing the rear of the vehicle) 16 and bottom member 16a, and also includes hinge members 14 which are attached, as by welding, to side members 21. Since the door may be expected to be part of a towing assembly, the hinge members are provided with hinge pins 17 capable of withstanding the stresses associated with towing. As shown in both FIG. 1 and FIG. 2 the door is in the open or lowered position. To retain the door in the up or closed position, holes are provided in side members 21 which are alignable with nuts 15 welded onto extensions 13, the nuts having internal threads 24. A pin having external thread on one end (not shown in FIG. 1 or FIG. 2) is passed through holes 23 and the external threads are engaged with internal threads 24 to retain the door in the closed position.

In actual construction, the straps 18 are made of three inch wide by 3/16 inch steel. Cross member 22 is preferably made of 12 inch wide by ⅜ inch steel plate. Bumper mounting extensions 13 comprise 3 inch by 6 inch box beams. The door 40 is constructed of 9/16 inch steel for bottom 16a and 3/16 inch steel for side members 21 and front member 16. The hinge members 14 are preferably ⅜ inch plate with a web 14a to provide lateral stability. The hinge pins 17 consist of 1 inch steel pins passed through a 1 inch inner diameter pipe (not shown) which may be welded through the 3 inch by 6 inch box beam extensions. All of the components shown may be attached by bolts through existing bolt holes in the vehicle frame.

Figure 3:
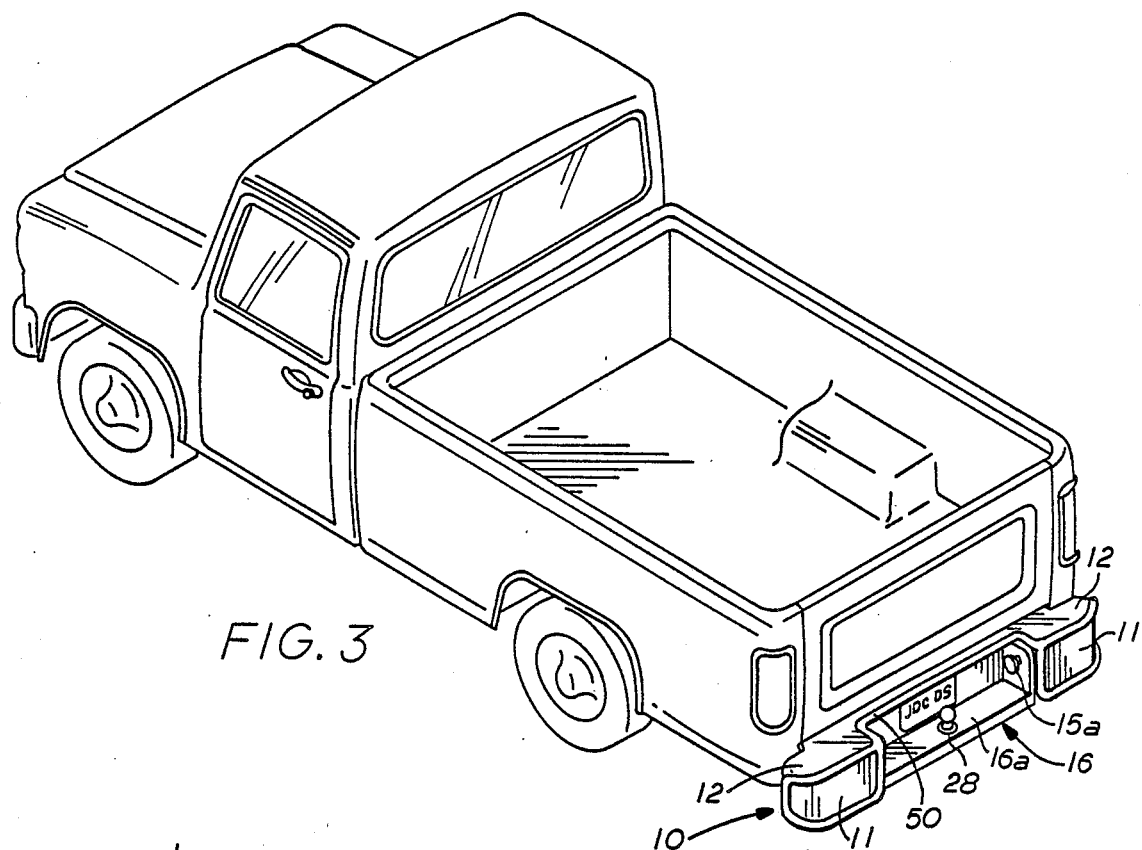
FIG. 3 is a perspective rear view of a pick-up truck with the bumper and storage compartment installed and the door closed.
Figure 4:
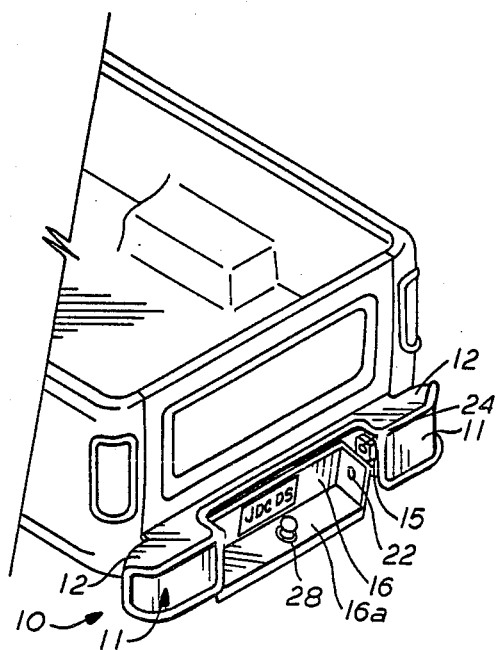
FIG. 4 is a partial view of that shown in FIG. 3 with the door retaining means and the door partially open.
Figure 5:
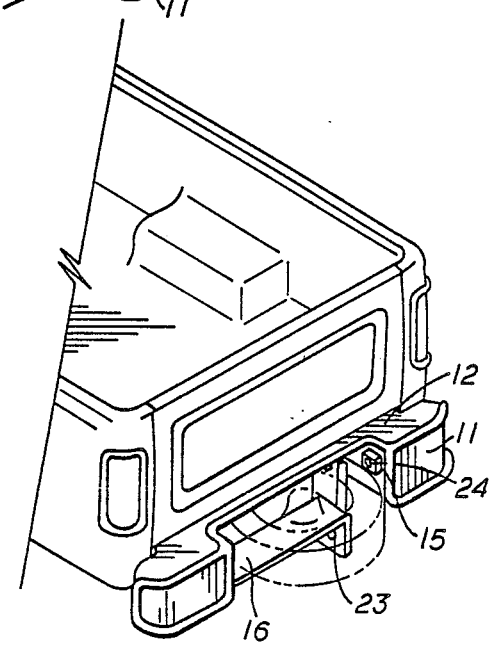
FIG. 5 is the same view as FIG. 4 with the door completely open.

FIGS. 3-5 illustrate the use of the access door through the bumper. To access the spare tire compartment latch pin(s) 15a, which may be a bolt or a knob (for manual operation) with a bolt extension, is unscrewed from nut 15 and the pin 15a removed. The door 40 is then swung downward to allow access to the compartment and the spare tire removed or replaced.

FIGS. 3 and 4 also show the optional towing ball 28 attached to the bottom 16a of the door. As may be seen the bumper is in the general configuration of a step bumper with the door acting as the step. A step bumper usually has a flat top surface 12 and flat face 11 defining an indention 50 which acts as a step with the door 40 located in the indention 50. As noted above the entire assembly is simply bolted onto the vehicle frame through existing bolt holes.

While the specific embodiment shown is fitted onto a pick-up truck, the invention with minor modifications may be adapted to fit on any vehicle which carries the spare tire on the underside.

The invention claimed is:

1. A combination vehicle bumper and tire storage compartment comprising:
    (a) a rack comprising:
        (i) a U-shaped cross bar attached to main frame members of a vehicle near the rear of said vehicle;
        (ii) at least two straps attached by one end to said cross bar and attached at the other end to a cross frame member of said vehicle, said straps having a shape that conforms to the shape of a tire;
    (b) a step bumper attached to said main frame members of said vehicle by means of a pair of opposed extensions extending from an inside of said step bumper, each of said extensions having first pin apertures for receiving hinge pins;
    (c) a closure mounted on said step bumper comprising:
        (i) a rectangular box like structure open at rear and top sides, and having two opposed side members, a bottom member forming a step of said bumper and a front member forming a door which forms a sole access to said rack;
        (ii) a hinge member extending from each of said side members and aligned with an inside surface of said extensions, said hinge members having second pin apertures for receiving said hinge pins; and
        (iii) said hinge pins passed through said first and second pin apertures to rotatably secure said closure to said extension, said closure being arranged for rotation rearward and downward about said hinge pins, said first and second apertures being positioned to allow access to said rack when said closure is rotated downwardly; and
    (d) means for latching and securing comprising a hole in each said side member aligned with an internally threaded hole in each said adjacent extension and a releasable bolt extending through said hole, engaged in said internally threaded hole and including a portion of said bolt positioned in said rectangular box like structure for operating said bolt.

2. The combination of claim 1 wherein said releasable bolt comprises a knob for manual operation.

3. In combination:
    I. vehicle and
    II. a bumper and tire storage compartment comprising:
        (a) a rack comprising:
            (i) a U-shaped cross bar attached to main frame members of said vehicle and near the rear of said vehicle;
            (ii) at least two straps attached by one end to said cross bar and attached at the other end to a cross frame member of said vehicle, said straps having a shape that conforms to the shaped of a tire;
        (b) a step bumper attached to said main frame members of said vehicle by means of a pair of opposed extensions extending from an inside of said step bumper, each of said extension having first pin apertures for receiving hinge pins;
        (c) a closure mounted on said step bumper comprising:
            (i) a rectangular box like structure open at rear and top sides, and having two opposed side members, a bottom member forming a step of said bumper and a front member forming a door which forms a sole access to said rack;
            (ii) a hinge member extending from each of said side members and aligned with an inside surface of said extensions, said hinge members having second pin apertures for receiving said hinge pins; and
            (iii) said hinge pins passed through said first and second pin apertures to rotatably secure said closure to said extensions, said closure being arranged for rotation rearward and downward about said hinge pins, said first and second apertures being positioned to allow access to said rack when said closure is rotated downwardly; and
        (d) means for latching and securing comprising a hole in each said side member aligned with an internally threaded hole in each said adjacent extension and a releasable bolt extending through said hole, engaged in said internally threaded hole and a portion of said bolt positioned in said rectangular box like structure for operating said bolt.

4. The combination of claim 3 wherein said releasable bolt comprises a knob for manual operation.

* * * * *